No. 741,624. Patented October 20, 1903.

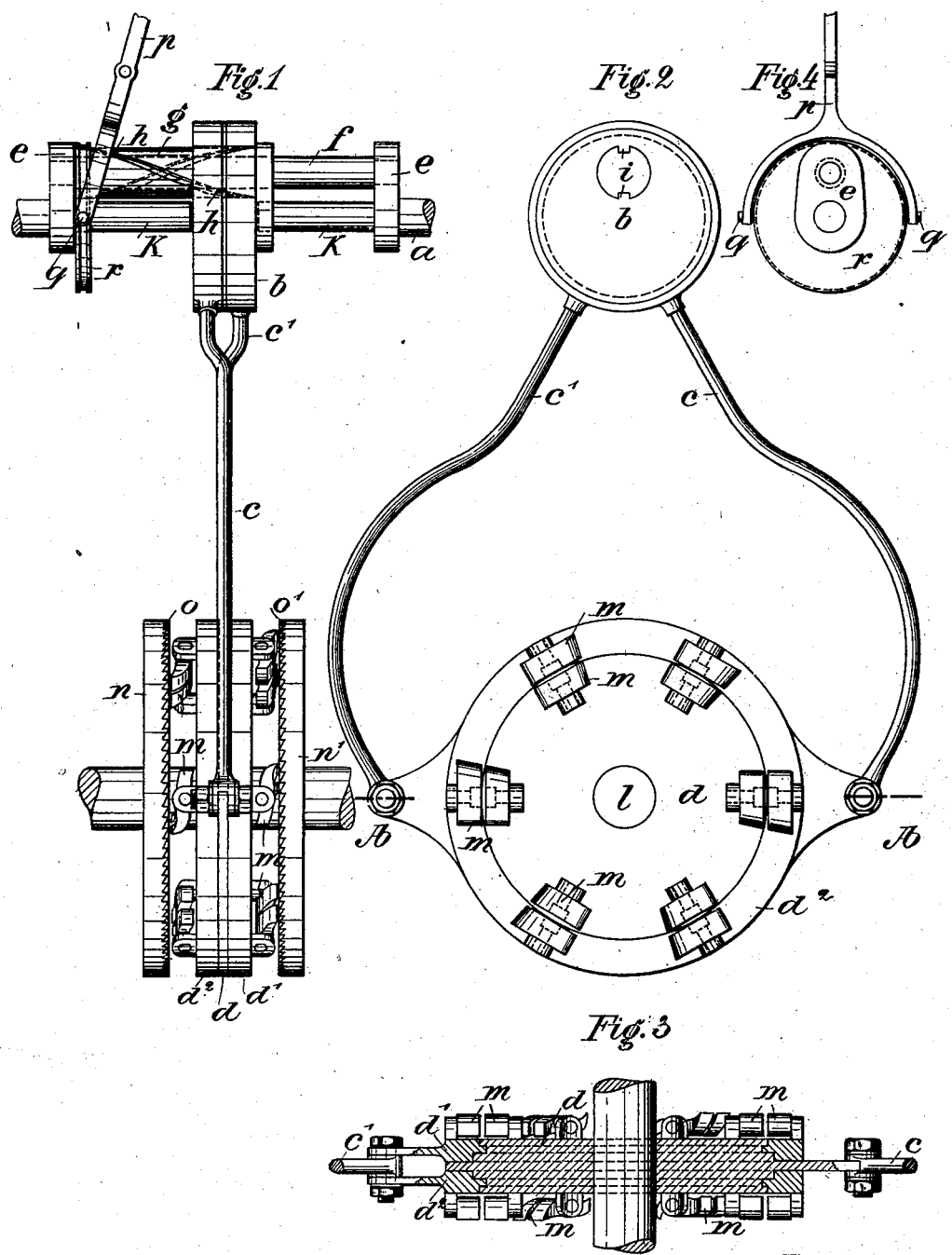

UNITED STATES PATENT OFFICE.

OTTO CARACCIOLA, OF COLOGNE, GERMANY.

REVERSIBLE GEAR WITH ADJUSTABLE STROKE.

SPECIFICATION forming part of Letters Patent No. 741,624, dated October 20, 1903.

Application filed January 23, 1903. Serial No. 140,236. (No model.)

*To all whom it may concern:*

Be it known that I, OTTO CARACCIOLA, a citizen of the German Empire, residing at Benesisstrasse No. 59, Cologne, in the Rhineland, Prussia, Germany, have invented a new and useful Improvement in Reversible Gear with Adjustable Stroke, of which the following is a specification.

The improvement over the devices hitherto known consists in the fact that the eccentricity of the eccentric can be altered at will at any time and that the extent of the reciprocating movement, the stroke, can thus be controlled.

In the annexed drawings, Figure 1 is a front view of the device; Fig. 2, a side view with the closing-plate omitted, and Fig. 3 a horizontal section of the device. Fig. 4 is a front view of the crank and lever for adjusting the sheave.

The eccentric $b$ with the adjustable stroke is mounted on the driving-shaft $a$ or a prolongation shaft and is driven by the motor and transmits its motion by means of rods $c$ and $c'$ to the disks $d$, $d'$, and $d^2$, fixed to the shaft of a differential gear. The adjustable eccentric $b$ consists of two rings and is mounted on a crank $e$, on the pin $f$ of which is a sleeve $g$. The said sleeve $g$ is provided with helical grooves $h$ and is adapted to slide on the pin $f$, but not to rotate on the same. The lever $p$ is adapted to perform a pendulum movement about its fulcrum and is bifurcated at its lower end, the bifurcated end being provided with two pins $q$, which take into a groove on the circumference of a disk $r$. The disk $r$ is rigidly connected to the sleeve $g$ and allows the latter to rotate about the driving-shaft. The stroke of the eccentric $b$ is proportional to the throw of the crank $e$. The hole in the eccentric is provided with two helical splines $i$, which take into the helical grooves $h$ in the sleeve $g$. The lateral displacement of the eccentric $b$ is limited by stops $k$, fixed to the driving-shaft and passing through the crank. The lateral displacement of the sleeve $g$ compels the eccentric to perform a rotary movement about the crank-pin $f$. The adjusted stroke of the eccentric $b$ transmits the motion of the driving-shaft through the rods $c$ and $c'$ to the disk $d$ and rings $d'$ and $d^2$, which are loosely mounted on the driven shaft $l$. The disk $d$ is situated between the rings $d'$ and $d^2$ and is provided on each side with a circumferential groove which serves as a bearing for one of the rings $d'$ or $d^2$. The disk $d$ and the rings $d'$ and $d^2$ are therefore at all times able to perform the opposite rotary movement required by the arrangement of the eccentric. To the lateral surfaces of the disk $d$ and the rings $d'$ and $d^2$ equal numbers of spring-pressed pawls $m$ are attached, which are so arranged in their bearings that they rotate with the respective ring or the disk. To the right and left of the disk two disks $n$ and $n'$ are fixed to the driven shaft. The inner surfaces of these disks are provided with teeth $o$ $o'$, directed toward the pawls, the teeth on one disk being forwardly directed and those on the other disk rearwardly directed.

The action of the device is as follows: When the sleeve $g$ is displaced on the crank-pin $f$ by means of the lever $p$, the helical grooves $h$, which engage the helical splines $i$, adjust the eccentric for a certain stroke. This stroke can be of any desired length within the limits according to whether the sleeve $g$ is moved more or less forward or backward. The rotary movement is transmitted by the rods $c$ and $c'$ to the disk $d$ and rings $d'$ and $d^2$ and by the said disk and rings to the right-hand or left-hand toothed disk $n$ or $n'$ according to the adjustment of the central disk $d$, connected to the rings. The pawls of the ring $d'$ or those of the disk $d$ work with the disk $n'$, and in the other case the pawls of the ring $d^2$ or those of the disk $d$ work with the disk $n$. The pawls $m$ are so arranged that during the working the first pawl touches the base of the intervals between the teeth when the second pawl is removed from the said base by the fraction represented by the number of the teeth between the first and second pawls—that is to say, one-fifth with five teeth, one tenth with ten teeth, and so on. By this means a very small subdivision is obtained with strong pawls and teeth.

Having now particularly described and ascertained the nature of my said invention and in what manner the same is to be performed, I declare that what I claim is—

1. In a reversible gear mechanism, means for adjustment for any desired stroke either for forward or backward movement, comprising an adjustable eccentric, a sleeve provided with helical grooves for adjusting said eccentric, means for shifting said sleeve, a crank-pin on which said sleeve is adapted to slide, and means for preventing said sleeve from turning on said pin.

2. In a device of the nature set forth, the combination of an adjustable eccentric, a change disk and rings, rods connecting said eccentric with said disk and rings, said disk and rings being arranged so that an opposite rotary movement of said disk and rings is at all times insured, pawls pivoted to said disk and rings, a shaft on which said disk is mounted, and toothed disks secured to said shaft and adapted to be engaged by said pawls to drive said shaft.

In witness whereof I have hereunto set my hand in presence of two witnesses.

OTTO CARACCIOLA.

Witnesses:
  CARL SCHMITT,
  GUSTAV SINNHOLD.